(12) United States Patent
Hagen

(10) Patent No.: US 6,812,669 B2
(45) Date of Patent: Nov. 2, 2004

(54) RESONANT SCANNING MIRROR DRIVER CIRCUIT

(75) Inventor: Mark D. Hagen, Rochester, MN (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 10/172,579

(22) Filed: Jun. 14, 2002

(65) Prior Publication Data

US 2003/0230997 A1 Dec. 18, 2003

(51) Int. Cl.[7] .............................................. G05B 11/28
(52) U.S. Cl. ........................ 318/629; 318/599; 318/603
(58) Field of Search ................. 318/569, 599, 318/600, 603, 629; 341/126, 127, 144, 147, 155

(56) References Cited

U.S. PATENT DOCUMENTS

| | | | | | |
|---|---|---|---|---|---|
| 3,649,902 A | * | 3/1972 | Dunbar | .......................... | 363/41 |
| 3,654,450 A | * | 4/1972 | Webb | .......................... | 708/271 |
| 3,657,657 A | * | 4/1972 | Jefferson | ..................... | 327/117 |
| 3,659,226 A | * | 4/1972 | Angeleri et al. | ............. | 332/112 |
| 3,713,137 A | * | 1/1973 | Stone | .......................... | 341/127 |
| 3,742,326 A | * | 6/1973 | Okuda et al. | ................ | 318/603 |
| 4,426,149 A | * | 1/1984 | Kuemmel et al. | ........... | 399/200 |
| 4,584,658 A | * | 4/1986 | Ottobre et al. | .............. | 708/276 |
| 5,453,833 A | * | 9/1995 | Kawashima et al. | ......... | 356/450 |

* cited by examiner

*Primary Examiner*—Bentsu Ro
(74) *Attorney, Agent, or Firm*—William B. Kempler; W. James Brady, III; Frederick J. Telecky, Jr.

(57) ABSTRACT

A micro-electro-mechanical system (MEMS) resonant scanning mirror driver circuit has separate amplitude and waveshape inputs which allows a relatively slow and therefore inexpensive DAC to be used to control the amplitude of the drive signal for the MEMS device.

14 Claims, 3 Drawing Sheets

300
1 0 1 1 0 1 1 0 1 1 1 1 0 1 1 1 1 1 1 0 1 1 1 1 0 1 1 0 1 1 0 1
0 1 0 0 1 0 0 1 0 0 0 0 1 0 0 0 0 0 0 1 0 0 0 0 1 0 0 1 0 0 1 0
FIG. 4a
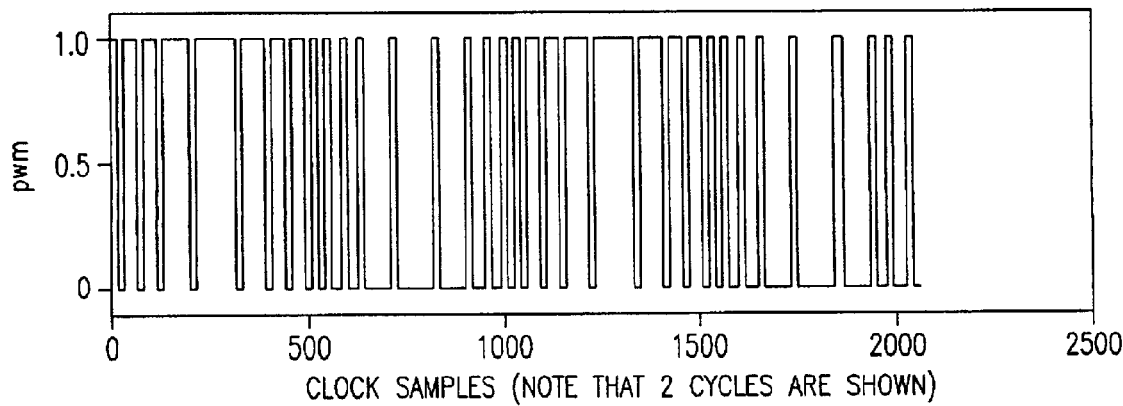
CLOCK SAMPLES (NOTE THAT 2 CYCLES ARE SHOWN)
FIG. 4b
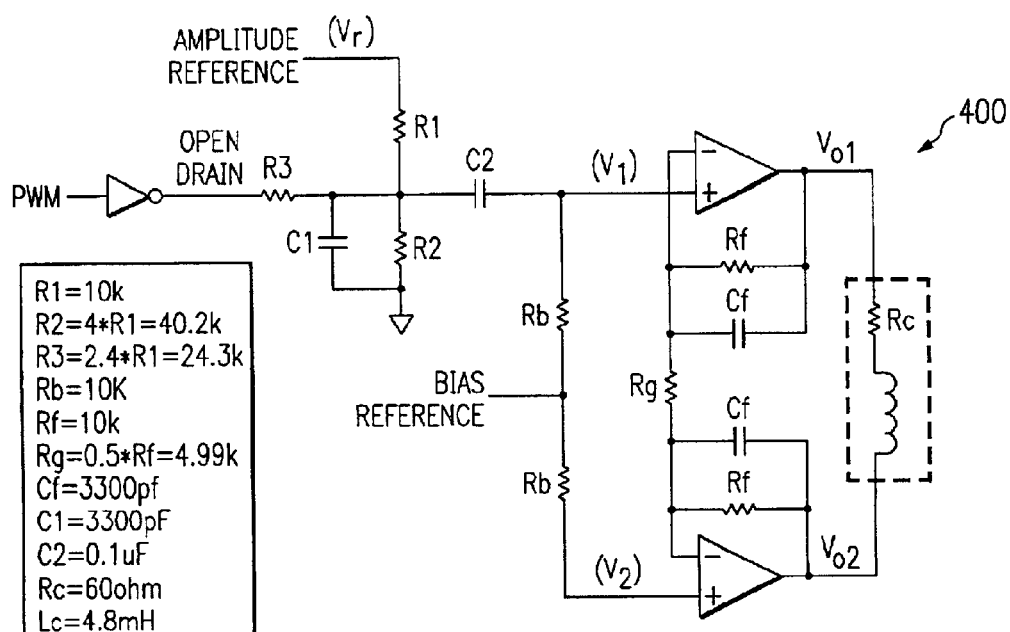
R1=10k
R2=4*R1=40.2k
R3=2.4*R1=24.3k
Rb=10K
Rf=10k
Rg=0.5*Rf=4.99k
Cf=3300pf
C1=3300pF
C2=0.1uF
Rc=60ohm
Lc=4.8mH
FIG. 5

RESONANT SCANNING MIRROR DRIVER CIRCUIT

BACKGROUND OF THE INVENTION

1. Field of the Invention

This invention relates generally to micro-electro-mechanical system (MEMS) mirrors, and more particularly, to a MEMS resonant scanning mirror driver circuit.

2. Description of the Prior Art

Movement of a resonant MEMS mirror is accomplished using a control loop that includes a sinusoidal driver circuit. This driver circuit must have low harmonic distortion characteristics in order to precisely and accurately control movement of the MEMS mirror. Such driver circuits generally require use of either a precision analog oscillator or a fast and therefore expensive digital-to-analog converter (DAC) devices and accompanied sine wave logic to control the amplitude of the drive signal to a MEMS resonant scanning mirror.

In view of the foregoing, it would be desirable and advantageous in the MEMS mirror art to provide a resonant scanning mirror driver circuit that allows use of an inexpensive means of generating the sine wave and an inexpensive DAC with a relatively slow sample rate commensurate with a microprocessor based control algorithm.

SUMMARY OF THE INVENTION

The present invention is directed to a MEMS resonant scanning mirror driver circuit. The driver circuit has separate amplitude and waveshape inputs which allows a relatively slow and therefore inexpensive DAC to be used to control the amplitude of the drive signal for the MEMS device.

According to one embodiment, a resonant scanning mirror driver circuit is provided that has an analog input to set the amplitude of a sinusoidal drive voltage and further has a PWM digital input that generates the sinusoidal waveform.

BRIEF DESCRIPTION OF THE DRAWINGS

Other aspects, features and advantages of the present invention will be readily appreciated, as the invention becomes better understood by reference to the following detailed description when considered in connection with the accompanying drawing figure wherein:

FIGS. 4a and 4b illustrate a digital pattern and a waveform diagram showing a single pulse width modulated digital signal wherein the single pulse width modulated digital signal shown in FIG. 4b is generated from the digital pattern shown in FIG. 4a;

FIG. 5 is a schematic diagram illustrating a resonant scanning mirror driver circuit according to another embodiment of the present invention and that can be driven with the single pulse width modulated digital signal shown in FIG. 4b.

While the above-identified drawing figure sets forth particular embodiments, other embodiments of the present invention are also contemplated, as noted in the discussion. In all cases, this disclosure presents illustrated embodiments of the present invention by way of representation and not limitation. Numerous other modifications and embodiments can be devised by those skilled in the art which fall within the scope and spirit of the principles of this invention.

DETAILED DESCRIPTION OF THE PREFERRED EMBODIMENTS

As stated herein before, movement of a MEMS mirror is accomplished using a control loop that includes a driver circuit. This driver circuit must have low harmonic distortion characteristics in order to precisely and accurately control movement of the MEMS mirror. Such driver circuits generally require use of fast and therefore expensive digital-to-analog converter (DAC) devices to control the amplitude of the drive signal to a MEMS resonant scanning mirror. A resonant scanning mirror driver circuit that allows use of a relatively slow and therefore inexpensive DAC to control the amplitude of the drive signal to the MEMS resonant scanning mirror is now described below with reference to FIGS. 1–5.

Figure 1:
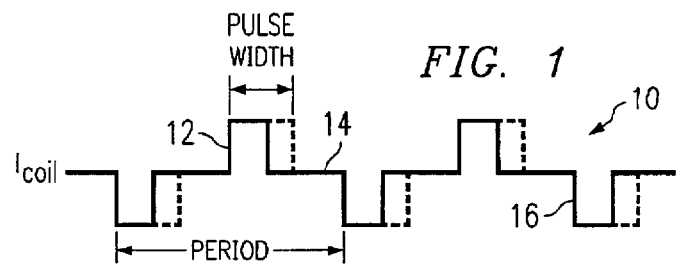
FIG. 1 is a timing diagram depicting a tri-level PWM pulse waveform.

FIG. 1 is a waveform diagram depicting a tri-level PWM pulse waveform 10 associated with the current passing through a MEMS resonant scanning mirror device. PWM pulse waveform 10 has a positive pulse 12, a nominal zero level 14, and a negative pulse 16.

Figure 2:
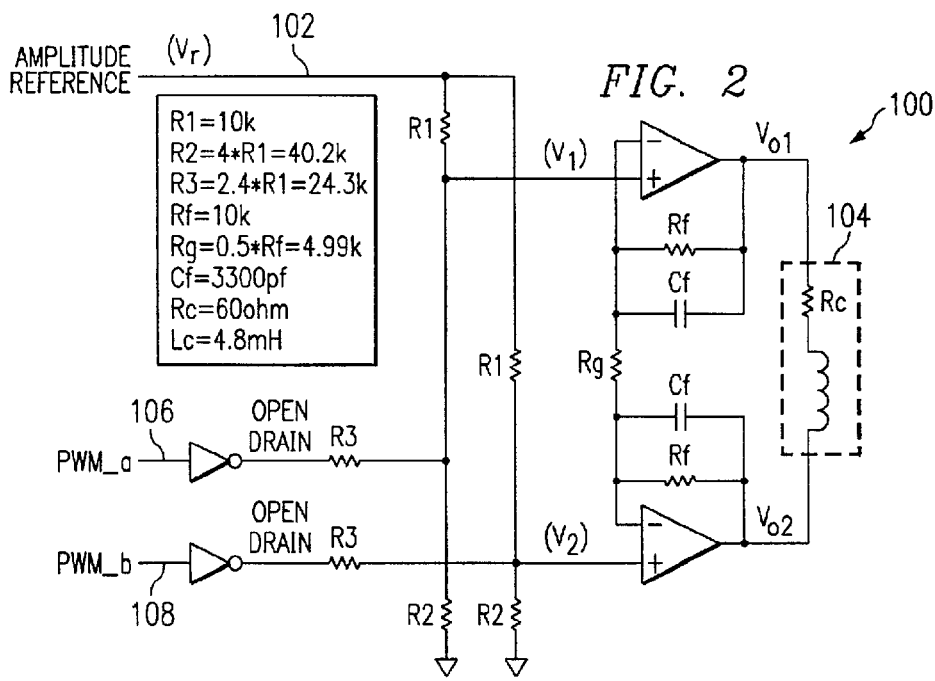
FIG. 2 is a schematic diagram illustrating a resonant scanning mirror driver circuit according to one embodiment of the present invention.

FIG. 2 is a schematic diagram illustrating a resonant scanning mirror driver circuit 100 according to one embodiment of the present invention. Driver circuit 100 has an analog input 102 to set the amplitude of sinusoidal drive voltage to the MEMS resonant scanning mirror device 104. Driver circuit 100 further has PWM digital inputs 106, 108 that provide a tri-level PWM pulse waveform, such as waveform 10 depicted in FIG. 1, to generate the desired sinusoidal waveform signal to the MEMS device 104. Driver circuit 100 generates a voltage output, and therefore is sensitive to temperature induced changes in the MEMS device 104 coil resistance Rc. Those skilled in the resonant scanning mirror art will readily appreciate that such a voltage output will provide several advantages over a transconductance amplifier if the actual application includes a beam position feedback. Resonant scanning mirror driver circuit 100 was found by the present inventor to achieve less than −60 dB harmonic distortion in a laser beam deflection using its lowest possible PWM clock.

Resonant scanning mirror driver circuit 100 can be defined mathematically according to its transfer function written as $$\frac{I_{coil}}{(v_1 - v_2)} = \frac{\left(\frac{1}{L_c}s + \frac{G\omega^2}{R_c}\right)}{s^2 + \frac{R_c}{L_c}s + \omega^2} = \frac{\frac{1}{L_c}\left(s + \frac{G}{R_f C_f}\right)}{s^2 + \frac{R_c}{L_c}s + \omega^2},$$

where the DC voltage gain is $$G = 1 + \frac{2R_f}{R_g} = 5$$

for the component values set forth in FIG. 2. Since the cutoff frequency is defined by $$\omega^2 = \frac{R_c}{R_f L_c C_f},$$

the values $R_c$=60 Ohms, $L_c$=4.8 mH, and $C_f$=3300 pF shown in FIG. 1 yield a cutoff of 3.1 kHz. The Q of the poles for these component values is $$\frac{\omega L_c R_c}{R_c^2 + L_c^2 \omega^2} \approx \frac{\omega L_c}{R_c} = 1.5.$$

The zero is then at $$\omega_z = \frac{G}{R_f C_f} = 24 \text{ kHz}.$$

The input network associated with driver circuit 100 is configured such that the voltage applied to the analog input Vr is also applied across the MEMS device 104 coil.

The mechanical transfer function according to one embodiment of the MEMS mirror 104 can be mathematically defined as $$\frac{\text{deflection}}{I_{coil}} = \frac{\omega_{res}^2}{s^2 + \frac{\omega_{res}}{Q}s + \omega_{res}^2},$$

for a normalized deflection gain, where the resonant frequency $\omega_{res}$ for the MEMS mirror 104 was found to be 2,000 Hz with a Q=50. The harmonic distortion in deflection associated with the above MEMS mirror 104 can be mathematically defined as $$10\log_{10}\left(\frac{\sum_{n=2}^{9} harm_n}{harm_1}\right).$$

Figure 3:
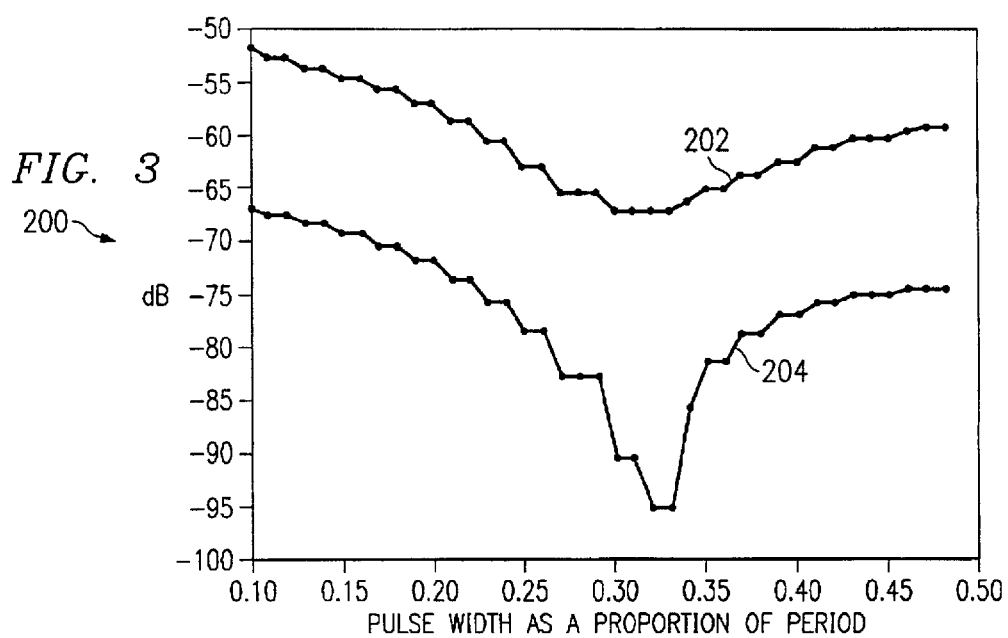
FIG. 3 is a graph illustrating harmonic distortion with respect to pulse width and pulse width as a proportion of period for the resonant scanning mirror driver circuit shown in FIG. 2 when driven with a tri-level PWM pulse waveform such as depicted in FIG. 1.

FIG. 3 is a graph illustrating harmonic distortion 200 with respect to pulse width, and pulse width as a proportion of period for the resonant scanning mirror driver circuit 100 shown in FIG. 2 when driven with a tri-level PWM pulse waveform such as depicted in FIG. 1. Specifically, the upper plot 202 shows the harmonic distortion with a high bandwidth on the amplifier, while the lower plot 204 shows the harmonic distortion with a bandwidth of 3.1 kHz. The best performance can be seen to occur when the positive and negative pulses are each about ⅓ of a period. The harmonics in the deflection can then be virtually eliminated by limiting the bandwidth of the amplifier.

FIGS. 4a and 4b depict a waveform diagram showing a single pulse width modulated (PWM) digital signal 300. PWM signal 300 can also be used to generate a sine wave for the MEMS mirror 104 coil drive so long as PWM signal 300 has a sufficiently high clock rate so that the harmonics in the digital signal are attenuated by the transfer function of the associated mirror driver circuit. Specifically, FIG. 4a depicts a digital pattern that is repeated continuously to generate the PWM waveform with a 64× oversample clock seen in FIG. 4b, wherein the digital clock is set to 64× the resonant frequency of the MEMS device. The single pulse width modulated digital signal 300 was found by the present inventor to provide less harmonic distortion (<-100 dB) than that achievable using the tri-level scheme described herein before with reference to FIGS. 1–3.

FIG. 5 is a schematic diagram illustrating a resonant scanning mirror driver circuit 400 according to another embodiment of the present invention and that can be driven with the single pulse width modulated digital signal 300 shown in FIG. 4b. The bias input level most preferably is set to the middle of the operating range of the input signal.

Figure 6:
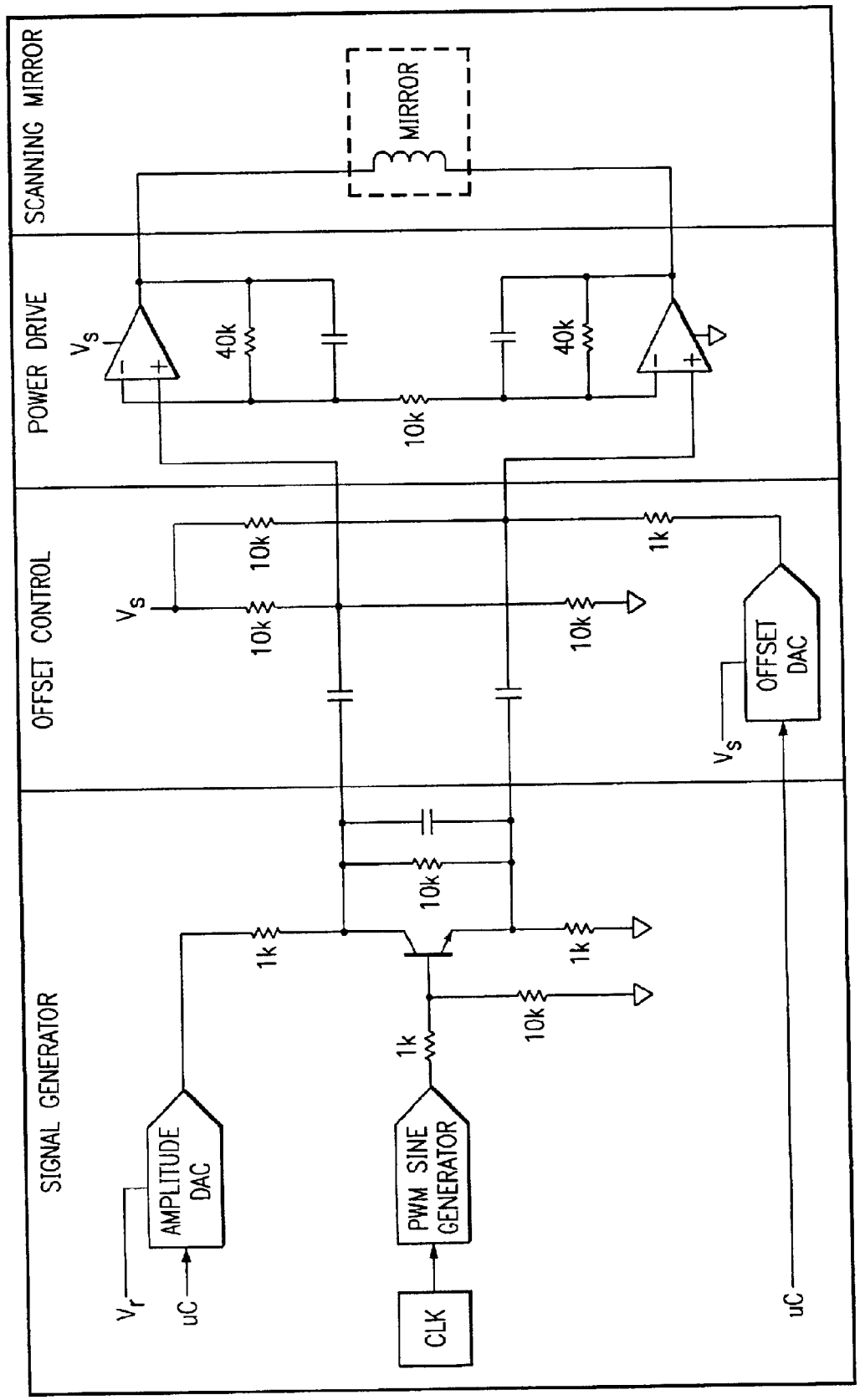
FIG. 6 is a schematic diagram illustrating a resonant scanning mirror driver circuit according to yet another embodiment of the present invention and that can be driven with the single pulse width modulated digital signal shown in FIG. 4b.

FIG. 6 is a schematic diagram illustrating a resonant scanning mirror driver circuit 500 according to yet another embodiment of the present invention and that is also suitable to be driven with the single pulse width modulated digital signal shown in FIG. 4b that is generated via the digital pattern shown in FIG. 4a. Driver circuit 500 can be shown to have a more symmetric output voltage. The output is defined according to the relationship $$v_{out} = \frac{s + (A+1)\omega}{s + \omega} v_{in},$$

where ω is the pole of the driver, not including the mirror coil, and A is the amplifier's dc voltage gain. The topology of driver circuit 500 was found by the present inventor to have improved AC characteristics because both the positive (+) and negative (–) outputs have the same frequency transfer function.

In view of the above, it can be seen the present invention presents a significant advancement in the art of MEMS mirror driver circuits. Further, this invention has been described in considerable detail in order to provide those skilled in the resonant scanning mirror driver circuit art with the information needed to apply the novel principles and to construct and use such specialized components as are required. In view of the foregoing descriptions, it should be apparent that the present invention represents a significant departure from the prior art in construction and operation. However, while particular embodiments of the present invention have been described herein in detail, it is to be understood that various alterations, modifications and substitutions can be made therein without departing in any way from the spirit and scope of the present invention, as defined in the claims which follow.

What is claimed is:

1. A resonant scanning mirror driver circuit configured to generate a desired micro-electro-mechanical system (MEMS) mirror drive voltage in response to a PWM pattern selected from among a plurality of PWM patterns at a given clock frequency to minimize harmonic distortions in mechanical deflections associated with a predetermined scanning resonant mirror, wherein the driver circuit comprises:

an input stage having an analog signal input and at least one digital signal input, wherein the input stage is configured to generate a desired sinusoidal signal having a frequency determined in response to at least one pulse width modulated (PWM) signal applied to the at least one digital signal input, and further having an amplitude determined in response to an analog amplitude reference signal applied to the analog signal input;

an output stage operational in response to the desired sinusoidal signal to generate the desired micro-electro-mechanical system (MEMS) mirror drive voltage; and wherein the input stage is further configured to generate the desired sinusoidal mirror deflection in response to a positive pulse PWM signal and further in response to a negative pulse PWM signal.

2. A resonant scanning mirror driver circuit configured to generate a desired micro-electro-mechanical system (MEMS) mirror deflection in response to a PWM pattern selected from among a plurality of PWM patterns at a given clock frequency to minimize harmonic distortions in mechanical deflections associated with a predetermined scanning resonant mirror, wherein the driver circuit comprises:

an input stage having an analog signal input and at least one digital signal input, wherein the input stage is configured to generate a desired sinusoidal signal having a frequency determined in response to at least one pulse width modulated (PWM) signal applied to the at least one digital signal input, and further having an amplitude determined in response to an analog amplitude reference signal applied to the analog signal input;

an output stage operational in response to the desired sinusoidal signal to generate the desired micro-electra-mechanical system (MEMS) mirror drive voltage; and wherein the output stage comprises:

a first voltage follower amplifier operational to deliver a positive drive voltage to the MEMS mirror; and a second voltage follower amplifier operational to deliver a negative drive voltage to the MEMS mirror.

3. A resonant scanning mirror driver circuit configured to generate a desired micro-electra-mechanical system (MEMS) deflection in response to a PWM pattern selected from among a plurality of PWM patterns at a given clock frequency to minimize harmonic distortions in mechanical deflections associated with a predetermined scanning resonant mirror, wherein the driver circuit comprises:

an input stage having an analog signal input and at least one digital signal input, wherein the input stage is configured to generate a desired sinusoidal signal having a frequency determined in response to at least one pulse width modulated (PWM) signal applied to the at least one digital signal input, and further having an amplitude determined in response to an analog amplitude reference signal applied to the analog signal input;

an output stage operational in response to the desired sinusoidal signal to generate the desired micro-electra-mechanical system (MEMS) mirror drive voltage; and wherein the output stage comprises:

a first voltage follower amplifier operational to deliver a first portion of the drive voltage to the MEMS mirror; and a second voltage follower amplifier operational to deliver a second portion of the drive voltage to the MEMS mirror, wherein the first portion of the drive voltage is positive with respect to the second portion of the drive voltage.

4. A resonant scanning mirror driver circuit configured to generate a desired micro-electro-mechanical system (MEMS) mirror deflection in response to a PWM pattern selected from among a plurality of PWM patterns at a given clock frequency to minimize harmonic distortions in mechanical deflections associated with a predetermined scanning resonant mirror, wherein the driver circuit comprises:

an input stage having an analog signal input and at least one digital signal input, wherein the input stage is configured to generate a desired sinusoidal signal having a frequency determined in response to at least one pulse width modulated (PWM) signal applied to the at least one digital signal input, and further having an amplitude determined in response to an analog amplitude reference signal applied to the analog signal input;

an output stage operational in response to the desired sinusoidal signal to generate the desired micro-electro-mechanical system (MEMS) mirror deflection; and wherein the driver circuit is configured to have a transfer function defined by $$\frac{I_{coil}}{(v_1 - v_2)} = \frac{\frac{1}{L_c}\left(s + \frac{G}{R_f C_f}\right)}{s^2 + \frac{R_c}{L_c}s + \omega^2},$$

wherein $\omega$ is the driver circuit cutoff frequency, $$G = 1 + \frac{2R_f}{R_g}$$

is the driver circuit DC voltage gain, v1 and v2 are driver circuit reference voltages, $R_f$ is a driver circuit output stage feedback resistance, $C_f$ is a driver circuit output stage feedback capacitance, $R_c$ is a MEMS mirror coil resistance, and $L_c$ is a MEMS mirror coil inductance.

5. A resonant scanning mirror driver circuit configured to generate a desired micro-electro-mechanical system (MEMS) mirror deflection in response to a PWM pattern selected from among a plurality of PWM patterns at a given clock frequency to minimize harmonic distortions in mechanical deflections associated with a predetermined scanning resonant mirror, wherein the driver circuit comprises:

an input stage having an analog signal input and at least one digital signal input, wherein the input stage is configured to generate a desired sinusoidal mirror deflection having a frequency determined in response to at least one pulse width modulated (PWM) signal applied to the at least one digital signal input, and further having an amplitude determined in response to an analog amplitude reference signal, applied to the analog signal input;

an output stage operational in response to the desired sinusoidal signal to generate the desired micro-electro-mechanical system (MEMS) mirror deflection; and wherein the output stage is further operational in response to the desired sinusoidal signal to generate a mirror deflection to a MEMS mirror having a mechanical transfer function defined by $$\frac{\text{deflection}}{I_{coil}} = \frac{\omega_{res}^2}{s^2 + \frac{\omega_{res}}{Q}s + \omega_{res}^2}$$

to achieve a desired minimum level of harmonic distortion in the MEMS mirror wherein $\omega_{res}$ is the resonant frequency of the MEMS mirror and $I_{coil}$ is the current through a MEMS device coil.

6. A resonant scanning mirror driver circuit configured to generate a desired micro-electro-mechanical system (MEMS) mirror drive voltage in response to a PWM pattern selected from among a plurality of PWM patterns at a given clock frequency to minimize harmonic distortions in mechanical deflections associated with a predetermined scanning resonant mirror, wherein the driver circuit comprises:

an input stage having an analog signal input and at least one digital signal input, wherein the input stage is configured to generate a desired sinusoidal signal having a frequency determined in response to at least one pulse width modulated (PWM) signal applied to the at least one digital signal input, and further having an amplitude determined in response to an analog amplitude reference signal applied to the analog signal input;

an output stage operational in response to the desired sinusoidal signal to generate the desired micro-electromechanical system (MEMS) mirror deflection; and wherein the driver circuit is configured to have a transfer function defined by $$v_{out} = \frac{s + (sA + 1)\omega}{s + \omega} v_{in},$$

where $\omega$ is the pole of the driver circuit, not including the mirror coil, and A is the associated amplifier's dc voltage gain.

7. A resonant scanning mirror driver circuit comprising:
an input stage having an analog signal input, a first digital signal input, and a second digital signal input, wherein the input stage is configured to generate a desired sinusoidal signal having a frequency determined in response to a first pulse width modulated (PWM) signal applied to the first digital signal input, and further in response to a second PWM signal applied to the second digital signal input, and further wherein the desired sinusoidal signal has an amplitude determined in response to an analog amplitude reference signal applied to the analog signal input; and an output stage operational in response to the desired sinusoidal signal to generate a predetermined micro-electro-mechanical system (MEMS) mirror drive voltage.

8. The resonant scanning mirror driver circuit according to claim 7 wherein the first PWM signal is a positive pulse PWM signal and the second PWM signal is a negative pulse PWM signal.

9. The resonant scanning mirror driver circuit according to claim 7 wherein the output stage comprises:
a first voltage follower amplifier operational to deliver a positive drive voltage to the MEMS mirror; and
a second voltage follower amplifier operational to deliver a negative drive voltage to the MEMS mirror.

10. The resonant scanning mirror driver circuit according to claim 7 wherein the driver circuit is configured to have a transfer function defined by $$\frac{I_{coil}}{(v_1 - v_2)} = \frac{\frac{1}{L_c}\left(s + \frac{G}{R_f C_f}\right)}{s^2 + \frac{R_c}{L_c}s + \omega^2},$$

wherein $\omega$ is the driver circuit cutoff frequency, $$G = 1 + \frac{2R_f}{R_g}$$

is the driver circuit DC voltage gain, v1 and v2 are driver circuit reference voltages, $R_f$ is a driver circuit output stage feedback resistance, $C_f$ is a driver circuit output stage feedback capacitance, $R_c$ is a MEMS mirror coil resistance, and $L_c$ is a MEMS mirror coil inductance.

11. The resonant scanning mirror driver circuit according to claim 7 wherein the output stage is further operational in response to the desired sinusoidal signal to generate a drive voltage to a MEMS mirror having a mechanical transfer function defined by $$\frac{deflection}{I_{coil}} = \frac{\omega_{res}^2}{s^2 + \frac{\omega_{res}}{Q}s + \omega_{res}^2}$$

to achieve a desired minimum level of harmonic distortion in the MEMS mirror wherein $\omega_{res}$ is the resonant frequency of the MEMS mirror and $I_{coil}$ is the current through a MEMS device coil.

12. The resonant scanning mirror driver circuit according to claim 7 wherein the driver circuit is configured to have a transfer function defined by $$v_{out} = \frac{s + (sA + 1)\omega}{s + \omega} v_{in},$$

where $\omega$ is the pole of the driver circuit, not including the mirror coil, and A is the associated amplifier's dc voltage gain.

13. A resonant scanning mirror driver circuit comprising:
an input stage having an analog signal input and a sole digital signal input, wherein the input stage is configured to generate a desired sinusoidal signal having a frequency determined in response to a single pulse width modulated (PWM) signal applied to the sole digital signal input, and further having an amplitude determined in response to an analog amplitude reference signal applied to the analog signal input; and an output stage operational in response to the desired sinusoidal signal to generate a predetermined micro-electro-mechanical system (MEMS) mirror drive voltage, wherein the output stage comprises:
a first voltage follower amplifier operational to deliver a first portion of the drive voltage to the MEMS mirror; and
a second voltage follower amplifier operational to deliver a second portion of the drive voltage to the MEMS mirror, wherein the first portion of the drive voltage is positive with respect to the second portion of the drive voltage.

14. A resonant scanning mirror driver circuit comprising:
an input stage having an analog signal input and a sole digital signal input, wherein the input stage is configured to generate a desired sinusoidal signal having a frequency determined in response to a single pulse width modulated (PWM) signal applied to the sole digital signal input, and further having an amplitude determined in response to an analog amplitude reference signal applied to the analog signal input; and an output stage operational in response to the desired sinusoidal signal to generate a predetermined micro-electro-mechanical system (MEMS) mirror drive voltage, wherein the output stage is further operational in response to the desired sinusoidal signal to generate a drive voltage to a MEMS mirror having a mechanical transfer function defined by $$\frac{deflection}{I_{coil}} = \frac{\omega_{res}^2}{s^2 + \frac{\omega_{res}}{Q}s + \omega_{res}^2}$$

to achieve a desired minimum level of harmonic distortion in the MEMS mirror wherein $\omega_{res}$ is the resonant frequency of the MEMS mirror and $I_{coil}$ is the current through a MEMS device coil.

* * * * *